(12) United States Patent
Payton et al.

(10) Patent No.: US 8,370,422 B2
(45) Date of Patent: Feb. 5, 2013

(54) ESTABLISHING COMMON INTEREST NEGOTIATION LINKS BETWEEN CONSUMERS AND SUPPLIERS TO FACILITATE SOLVING A RESOURCE ALLOCATION PROBLEM

(75) Inventors: David W. Payton, Calabasas, CA (US); Aleksey Nogin, Fresno, CA (US)

(73) Assignee: Raytheon Company, Waltham, MA (US)

( * ) Notice: Subject to any disclaimer, the term of this patent is extended or adjusted under 35 U.S.C. 154(b) by 201 days.

(21) Appl. No.: 12/702,062

(22) Filed: Feb. 8, 2010

(65) Prior Publication Data
US 2011/0196912 A1    Aug. 11, 2011

(51) Int. Cl.
G06F 15/16    (2006.01)
(52) U.S. Cl. .................. 709/202; 709/226; 709/231
(58) Field of Classification Search .............. 709/202, 709/203, 223, 224, 226, 227, 228, 229
See application file for complete search history.

(56) References Cited

U.S. PATENT DOCUMENTS

| | | | | |
|---|---|---|---|---|
| 6,516,350 | B1 * | 2/2003 | Lumelsky et al. | 709/226 |
| 2002/0133611 | A1 * | 9/2002 | Gorsuch et al. | 709/231 |
| 2004/0088413 | A1 * | 5/2004 | Bhogi et al. | 709/226 |
| 2009/0030848 | A1 * | 1/2009 | Wendel | 705/80 |

OTHER PUBLICATIONS

Reid G. Smith, "The Contract Net Protocol: High-Level Communication and Control in a Distributed Problem Solver," © 1980 Canadian Crown Copyright, IEEE Transactions on Computers, vol. C-29, No. 12, Dec. 1980, pp. 1104-1113.
H. Van Dyke Parunak, "Practical and Industrial Applications of Agent-Based Systems," © 1998, Industrial Technology Institute, pp. 1-41, Mar. 1998.

* cited by examiner

*Primary Examiner* — Barbara Burgess
(74) *Attorney, Agent, or Firm* — Schwegman Lundberg & Woessner, P.A.

(57) ABSTRACT

A computer-implemented method includes communicating to a number of agents a first resource negotiation request that includes one or more first parameters each having a corresponding first range of acceptability. The method includes receiving first request responses from each of one or more capable agents each operable to fulfill at least one first parameter within the corresponding first range of acceptability. The method includes determining solution entities based on the first responses, each solution entity including one or more of the capable agents operable to fulfill the one or more parameters of the first request within the corresponding first ranges of acceptability, each capable agent operable to fulfill at least one first parameter within the corresponding first range of acceptability. The method includes communicating a second resource negotiation request to each capable agent in each determined solution entity, the second request including one or more second parameters each having a corresponding second range of acceptability.

19 Claims, 5 Drawing Sheets

ESTABLISHING COMMON INTEREST NEGOTIATION LINKS BETWEEN CONSUMERS AND SUPPLIERS TO FACILITATE SOLVING A RESOURCE ALLOCATION PROBLEM

TECHNICAL FIELD

This invention relates generally to obtaining resources and more particularly to establishing common interest negotiation links between consumers and suppliers to facilitate solving a resource allocation problem.

BACKGROUND

In many applications, it may be beneficial to reformulate a resource allocation problem as a supply chain having consumer entities and supplier entities. In such a supply chain, it may be beneficial for an entity (such as a consumer entity) to identify other entities (such as supplier entities) that are capable of fulfilling resource demands. For example, a consumer may need to communicate resource demands to a number of suppliers in order to determine which of the suppliers is capable of fulfilling those resource demands.

SUMMARY

According to the present invention, disadvantages and problems associated with previous techniques for establishing common interest negotiation links between consumers and suppliers may be reduced or eliminated.

A computer-implemented method includes communicating to a number of agents a first resource negotiation request that includes one or more first parameters each having a corresponding first range of acceptability. The method includes receiving first request responses from each of one or more capable agents each operable to fulfill at least one first parameter within the corresponding first range of acceptability. The method includes determining solution entities based on the first responses, each solution entity including one or more of the capable agents operable to fulfill the one or more parameters of the first request within the corresponding first ranges of acceptability, each capable agent operable to fulfill at least one first parameter within the corresponding first range of acceptability. The method includes communicating a second resource negotiation request to each capable agent in each determined solution entity, the second request including one or more second parameters each having a corresponding second range of acceptability.

Certain embodiments of the present invention may provide one or more technical advantages. Conventional techniques for identifying resource suppliers typically operate using publish/subscribe mechanisms by which certain agents advertise the ability to provide certain resources (resource suppliers) and agents in need of resources (resource consumers) subscribe to the advertisements in order to find resource suppliers that can fulfill those resource needs. These conventional techniques may be inefficient in that a resource consumer typically must negotiate with all resource suppliers rather than focus the negotiation on only those resource suppliers actually capable of supplying the resources that the resource consumer needs.

In contrast, according to certain embodiments of the present invention, the identification of a number of solution entities capable of fulfilling the parameters of a resource negotiation request and the limiting of further negotiation to the identified solution entities may increase efficiency by creating a narrowed search/optimization space through the elimination of agents from the negotiation process that are irrelevant or infeasible with regard to the resource negotiation request.

In a national defense context, for example, current techniques for scheduling intelligence resources generally operate on a twenty-four hour cycle, with a plan including a number of tasks for a particular twenty-four hour period being scheduled in the previous twenty-four hour period. If, however, urgent requests necessitate a change in the plan, much of the remainder of the plan may be invalidated. According to certain embodiments of the present invention, the identification of solution entities capable of fulfilling the parameters of a particular resource negotiation request and the limiting of further negotiations to the identified solution entities schedules intelligence resources in a more reactive manner such that greater effective use of available resources may be achieved.

In the context of multi-agent, multi-tier negotiation, current techniques may be inefficient in that they do not automatically establish multi-tier relationships between agents with the ability for one agent to provide a particular resource being contingent on that agent's ability to establish links with other agents that can supply resources needed for the agent to provide the particular resource. Embodiments of the present invention may propagate resource requirements of one agent to a number of other agents and match those resource requirements with the resource supply capabilities of other agents such that the intersection between requirements and capabilities can be iteratively refined until an explicit set of matching conditions is found.

Certain embodiments of the present invention may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
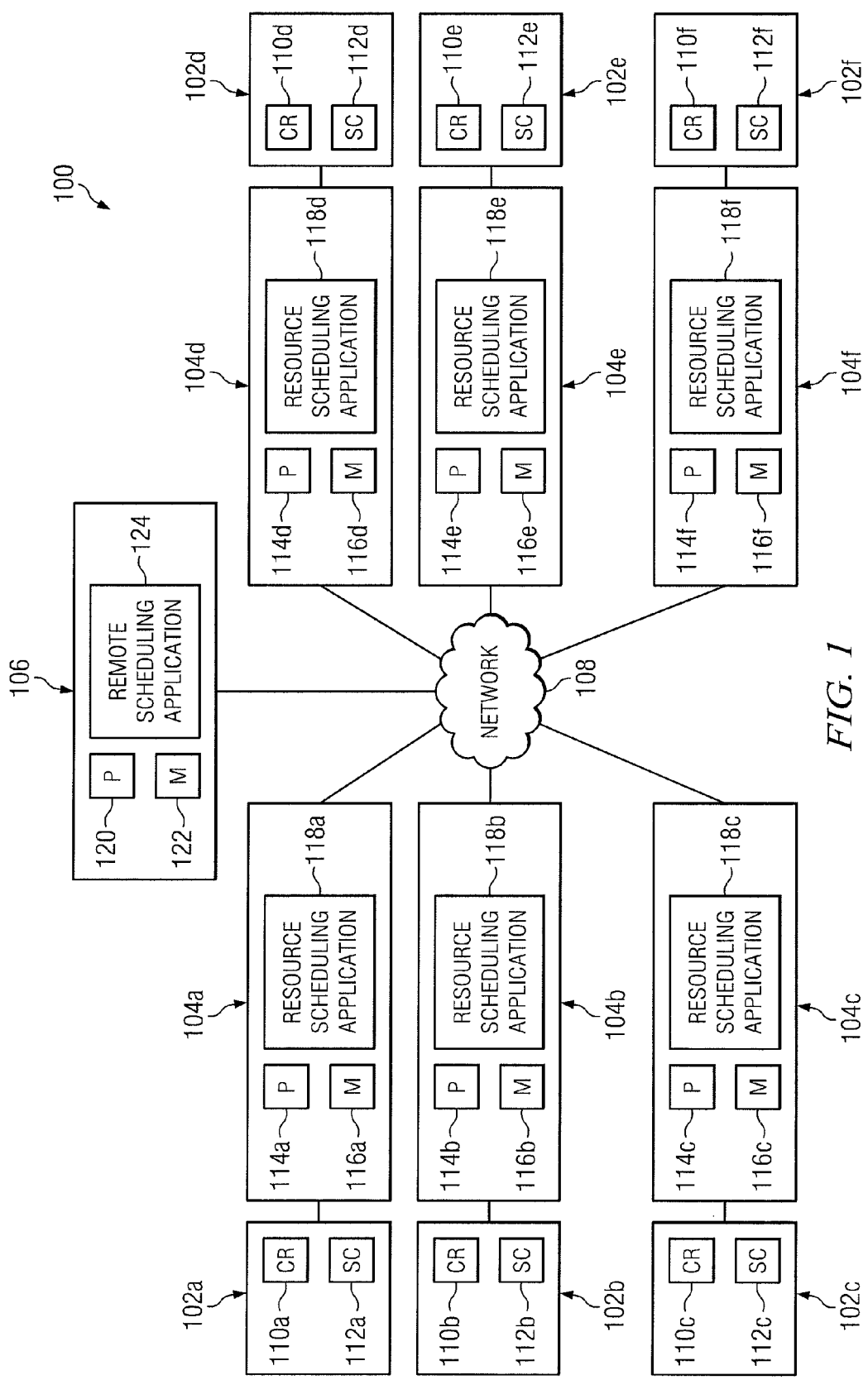
FIG. 1 illustrates an example system for establishing common interest negotiation links between consumers and suppliers to facilitate solving a resource allocation problem, according to certain embodiments of the present invention.

FIG. 1 illustrates an example system 100 for establishing common interest negotiation links between consumers and suppliers to facilitate solving a resource allocation problem, according to certain embodiments of the present invention. System 100 may include a number of agents 102, one or more resource scheduling systems 104, one or more remote scheduling systems 106, and a network 108. Although this particular implementation of system 100 is illustrated and primarily described, the present invention contemplates any suitable implementation of system 100 according to particular needs.

In general, system 100 is operable to establish common interest negotiation links between consumers (i.e., agents 102 seeking resources) and suppliers (i.e., agents 102 providing resources) in a supply chain (or a resource allocation problem that may be reformulated as a supply chain) by identifying those suppliers in the supply chain who are capable of meeting the resource requirements of a consumer and limiting further negotiation to those capable suppliers. Certain embodiments of the present invention may result in greater flexibility and efficiency in obtaining resources by narrowing the search/optimization space through the elimination of agents 102 from the negotiation process that are irrelevant or infeasible with regard to the resource negotiation request.

System 100 may include a plurality of agents 102. An agent 102 may include, for example, an enterprise, a human user associated with an enterprise, or a computer program or other suitable software module operable to automatically interact with resource scheduling systems 104.

An agent 102 may have associated resource consumption requirements 110 and associated resource supply capabilities 112. Resource consumption requirements 110 and resource supply capabilities 112 may include goods, services, existing data, data acquisition capabilities, or any other resource that may be consumed or produced, respectively, by an agent 102. For example, in the national defense context, agent 102a may have associated resource consumption requirements 110a that include intelligence data (e.g., aerial photographs of a particular location at a particular time).

Resource consumption requirements 110 and resource supply capabilities 112 associated with an agent 102 may be dynamic such that they may change over time based on a number of factors. For example, resource supply capabilities 112 associated with an agent 102 may change based on external factors (e.g., market factors beyond the control of the agent 102) and internal factors (e.g., resource supply capabilities of other agents 102, resource demands from other agents 102, and internal resource allocation choices of the agent 102). Although resource consumption requirements 110 and resource supply capabilities 112 are depicted and primarily described as being a part of agents 102, the present invention contemplates that resource consumption requirements 110 and resource supply capabilities 112 may be stored in resource scheduling systems 104 (e.g., in memory module 116) or in any other suitable location.

One or more agents 102 of system 100 may belong to a particular agent classification group based upon the characteristics of the agent 102 (e.g., the resource consumption requirements 110 and/or resource supply capabilities 112 of the agent 102). For example, in the national defense context, a particular group of agents 102 (such as an intelligence agencies or intelligence agency personnel charged with oversight of a particular mission) may be classified as "mission agents" because those agents 102 have associated resource consumption requirements 110 that include target information. Continuing with this example, a particular group of agents 102 (such as an intelligence agency or intelligence agency personnel charged with identifying targets) may be classified as "target agents" because those agents 102 have associated resource supply capabilities 112 that include target information. Continuing with this example, a particular group of agents 102 (such as collection devices on intelligence satellites associated with an intelligence agency) may be classified as "collector agents" because those agents have associated resource supply capabilities 112 that include raw intelligence information.

Although a particular number of agents 102 are depicted and primarily described, the present invention contemplates system 100 including any suitable number of agents. Furthermore, although each agent 102 is depicted and primarily described as having both associated resource consumption requirements 110 and associated resource supply capability 112, the present invention contemplates that one or more agents 102 may have any suitable combination of resource consumption requirements 110 and resource supply capabilities 112.

System 100 may include a plurality of resource scheduling systems 104. Each resource scheduling system 104 may be associated with a corresponding agent 102. Although each resource scheduling system 104 is depicted and primarily described as being associated with a single agent 102, each resource scheduling system 104 may be associated with any suitable number of agents 102. For example, a single resource scheduling system 104 may serve some or all agents 102 of system 100 (e.g., remote scheduling system 106 described below).

Each resource scheduling system 104 may be local or remote from the associated agent 102. Each resource scheduling system 104 may include one or more computer systems at one or more locations. Each computer system of each resource scheduling system 104 may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user of a resource scheduling system 104. Each computer system of each resource scheduling system 104 may include a personal computer, workstation, network computer, kiosk, wireless data port, personal data assistant (PDA), one or more processors within these or other devices, or any other suitable processing device.

Each resource scheduling system 104 may include one or more processing modules 114 and one or more memory modules 116. Processing module 114 may include one or more microprocessors, controllers, or any other suitable computing devices or resources. Processing module 114 may work, either alone or with other components of system 100, to provide the functionality of system 100 described herein. Memory module 116 may take the form of volatile or non-volatile memory including, without limitation, magnetic media, optical media, random access memory (RAM), read-only memory (ROM), removable media, or any other suitable memory component.

Resource scheduling systems 104 may be communicatively coupled one another (as well as to remote scheduling system 106, described below) via network 108. Network 108 facilitates wireless or wireline communication. Network 108 may communicate, for example, IP packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Resource scheduling system 104 may receive/access data associated with the resource consumption requirements 110 and/or the resource supply capabilities 112 of an associated agent 102.

Each resource scheduling system 104 may include a resource scheduling application 118. Resource scheduling application 118 may include any suitable combination of software, hardware, and firmware.

Resource scheduling applications 118 may be operable to communicate a resource negotiation request to other agents 102 (or agents 102 belonging to appropriate agent classification groups) in system 100. The resource negotiation request may be generated by resource scheduling application 118, received by resource scheduling system 104 from an associated agent 102, or received/generated in any other suitable manner.

The communicated resource negotiation request may include one or more parameters, the one or more parameters corresponding to any suitable combination of all or part of one or more resource consumption requirements 110 of the associated agent 102. Resource consumption requirements 110 of the associated agent 102 may be stored within resource scheduling system 104 (e.g., in memory module 116), external to resource scheduling system 104, or in any other suitable location such that resource scheduling application 118 may access resource consumption requirements 110. Each request parameter may have any suitable number of elements, each element specifying a further restriction on the parameter. For example, a negotiation request may comprise a parameter for an aerial photograph (zero elements), a parameter for an aerial photograph of location A (one element—location), an aerial photograph of location A at time X (two elements—location and time), or a high resolution photograph of location A at time X (three elements—location, time, and resolution).

Furthermore, the one or more parameters of the resource negotiation request may each have a corresponding range of acceptability. The range of acceptability may be broader than the parameter with which the range of acceptability corresponds. Because the range of acceptability may be broader than the parameter with which the range of acceptability corresponds, the range of acceptability may result in an over-approximation of the resource demand requirements 110 of the agent 102 with which the parameter of the negotiation request is associated. The range of acceptability corresponding to a particular parameter may have any suitable number of elements. Furthermore, the elements of a range of acceptability may correspond to the elements of the parameter to which the range of acceptability corresponds. For example, a negotiation request may comprise a parameter for an aerial photograph of location A at time X (two elements—location and time), and the parameter may have a corresponding range of acceptability of within a twenty-mile radius of location A within one hour of time X (two elements—location and time).

As a particular example, resource scheduling application 118a associated with the resource scheduling system 104a of agent 102a may be operable to generate and communicate a resource negotiation request comprising one or more parameters, each parameter having a corresponding range of acceptability, to each of the agents 102 of system 100 (or to a particular agent classification group comprised of one or more agents 102 or any other subset of agents 102 of system 100). More particularly, agent 102a may have associated resource consumption requirements 110a that include an aerial photograph of location A at time X and an aerial photograph of location B at time Y. In other words, agent 102a may seek aerial photographs of location A at time X and location B at time Y, and agent 102a may seek agents (e.g., appropriately equipped aircraft and or satellites) capable of fulfilling one or both of these requirements. In order to fulfill these particular resource consumption requirements 110a, resource scheduling application 118a may communicate a resource negotiation request to agents 102b-f of system 100, the resource negotiation request comprising a first parameter (an aerial photograph of location A at time X) and a second parameter (an aerial photograph of location B at time Y).

Furthermore, each of the parameters of the resource negotiation request communicated by resource scheduling application 118a may have a corresponding range of acceptability. For example, rather than communicating a resource negotiation request including parameters with no range of acceptability (i.e., identical to the corresponding resource consumption requirements 110a—aerial photographs of location A at time X and location B at time Y), the resource negotiation request may include parameters having a range of acceptability broader than the corresponding resource consumption requirements 110a (e.g., an aerial photograph within a twenty-mile radius of location A within one hour of time X and an aerial photograph of within a thirty-mile radius of location B within fifteen minutes of time Y).

In other words, the ranges of acceptability corresponding to the parameters of a resource negotiation request may allow for an over-approximation of the resource demand requirements 110a of agent 102a to which the parameters of the negotiation request corresponds. As a result, agents 102 capable of providing resources in the vicinity (i.e., within the specified ranges of acceptability) of the resource consumption requirements 110a to which the parameters of the resource negotiation request correspond ("capable agents") may be identified. Furthermore, further negotiation may be limited to those capable agents (and further negotiation with clearly irrelevant agents 102 may be eliminated), as described in further detail below.

Although the first parameter (an aerial photograph of location A at time X) and the second parameter (an aerial photograph of location B at time Y) of the resource negotiation request in the above-described example have been described as having two elements (i.e., a location element and a time element), the present invention contemplates that a parameter of a resource negotiation request may have any suitable number of elements. Furthermore, the elements of a parameter of a resource negotiation request may themselves be considered parameters. For example, the first parameter of the resource negotiation request in the above-described example (an aerial photograph of location A at time X) could be considered two separate parameters each having a single element (i.e., a parameter for an aerial photograph of location A and a parameter for an aerial photograph at time X).

Similarly, although the range of acceptability corresponding to the first parameter (within a twenty-mile radius of location A within one hour of time X) and the range of acceptability corresponding to the second parameter (within a thirty-mile radius of location B within fifteen minutes of time Y) in the above-described example have been described as having multiple elements (i.e., a location element and a time element), the present invention contemplates that a range of acceptability corresponding to a parameter of a resource negotiation request may have any suitable number of elements. Furthermore, the elements of a range of acceptability may correspond to the elements of the parameter to which the range of acceptability corresponds. For example, the range of acceptability corresponding to the first parameter of the resource negotiation request in the above-described example (within a twenty-mile radius of location A within one hour of time X) could be considered two separate ranges of acceptability each having a single element, each range of acceptability corresponding to a parameter having a single element (i.e., range of acceptability within a twenty-mile radius of location A corresponding to a parameter for an aerial photograph of location A and range of acceptability within one hour of time X corresponding to a parameter for an aerial photograph at time X).

Furthermore, one or more of the parameters of a resource negotiation request may be conjunctive parameters of a component of the resource negotiation request (i.e., one or more of the parameters of a negotiation request may be conjunctive with respect to one another, the conjunctive parameters collectively referred to as a component). For example, a resource negotiation request may include a first component (e.g., an aerial photograph) having a first parameter (location A) with a corresponding range of acceptability (within a twenty-mile radius of location A) and a second parameter (time X) having a corresponding range of acceptability (within one hour of time X). Furthermore, the first parameter and the second parameter may be conjunctive in that they refer to the same photograph.

Resource scheduling applications 118 may be operable to receive resource negotiation requests on behalf of associated agents 102, the resource negotiation requests having been communicated by one or more other agents 102 in system 100 (as described above). In response to the receipt of a resource negotiation request, a resource scheduling application 118 may be operable to determine, based on a comparison of resource supply capabilities 112 of the associated agent 102 and the one or more parameters of the resource negotiation request (considering corresponding ranges of acceptability, if appropriate), whether the associated agent 102 is capable of fulfilling one or more of the parameters of the negotiation request within the corresponding range of acceptability. Resource supply capabilities 112 may be stored within resource scheduling application 104 (e.g., in memory module 116), external to resource scheduling application 104, or in any other suitable location such that resource scheduling application 118 may access resource supply capabilities 112.

The determination by a resource scheduling application 118 as to whether one or more parameters of a resource negotiation request can be fulfilled by the associated agent 102 (potentially within the corresponding range of acceptability, if appropriate) may be made in any suitable manner. For example, a resource scheduling application 118 may receive information associated with resource supply capabilities 112 from an agent 102 associated with the resource scheduling application 118 and compare the received resource supply capabilities 112 to the parameters of the received resource negotiation request (considering corresponding ranges of acceptability, if appropriate). As another example, a resource scheduling application 118 may access stored information associated with resource supply capabilities 112 and compare the accessed resource supply capabilities to the parameters of the received resource negotiation request (considering corresponding ranges of acceptability, if appropriate). As yet another example, a resource scheduling application 118 may generate and communicate a resource negotiation request to a number of agents 102 of system 100 (as described above), determine the resource supply capabilities 112 of the associated agent 102 based on responses to the resource negotiation request received from capable agents 102, and compare the determined resource supply capabilities 112 to the parameters of the received resource negotiation request (considering corresponding ranges of acceptability, if appropriate).

Upon a determination that the associated agent 102 is capable of fulfilling one or more of the parameters or the resource negotiation request (within the corresponding range of acceptability, if appropriate), resource scheduling application 118 may be operable to generate and communicate a response to the resource negotiation request indicating the one or more parameters of the resource negotiation request that can be fulfilled by the associated agent 102. Although resource scheduling applications 118 are primarily described as being operable to generate and communicate a response to a resource negotiation request upon a determination that the associated agent 102 is capable of fulfilling one or more of the parameters or the resource negotiation request, the present invention contemplates resource scheduling applications 118 being operable to generate and communicate a response to a resource negotiation request upon a determination that the associated agent 102 is capable of fulfilling each of the conjunctive parameters (within the corresponding range of acceptability, if appropriate) of one or more components of a resource negotiation request (as described above).

In the above-described example, resource scheduling application 118b of resource scheduling system 104b associated with agent 102b may be operable to receive the resource negotiation request communicated by resource scheduling application 118a, the resource negotiation request having a first parameter with a corresponding first range of acceptability (an aerial photograph within a twenty-mile radius of location A within one hour of time X) and second parameter with a corresponding second range of acceptability (an aerial photograph within a thirty-mile radius of location B within fifteen minutes of time Y). Furthermore, agent 102b may have associated resource supply capabilities 112b including an aerial photograph within a two-mile radius of location A at a time within five minutes of time X. Based on a comparison of resource supply capabilities 112b of an agent 102b and the parameters of the received resource negotiation request (considering the corresponding range of acceptability), resource scheduling application 118b may be operable to determine that agent 102b is capable of fulfilling the parameter of the resource negotiation request within the corresponding range of acceptability.

In other words, resource scheduling application 118b may determine that an aerial photograph within a two-mile radius of location A at a time within five minutes of time X fulfills a parameter of the resource negotiation request communicated by resource scheduling application 118a within the corresponding range of acceptability (an aerial photograph within a twenty-mile radius 20 of location A within one hour of time X). Upon a determination that the agent 102b is capable of fulfilling the parameter or the resource negotiation request communicated by resource scheduling application 118a within the corresponding range of acceptability, resource scheduling application 118b may generate and communicate a response to the resource negotiation request to agent 102a indicating the parameter of the resource negotiation request that can be fulfilled by the agent 102b.

Resource scheduling applications 118 may be operable to receive from other agents 102 of system 100 one or more responses to a communicated resource negotiation request, a response indicating that the responding agent 102 is capable of fulfilling one or more of the parameters of the communicated resource negotiation request within the corresponding range of acceptability ("capable agents"). Based on the received responses from one or more capable agents 102 in response to a communicated resource negotiation request, resource scheduling application 118 may be further operable to determine a number of solution entities. Each solution entity may include one or more capable agents 102 that can fulfill the one or more parameters of the resource negotiation request within the corresponding ranges of acceptability. Although each solution entity is primarily described as including one or more capable agents 102 that can fulfill the one or more parameters of the resource negotiation request within the corresponding ranges of acceptability, the present invention contemplates a solution entity comprising one or more capable agents 102 that can fulfill one or more components of a negotiation request, each component comprising one or more conjunctive parameters each having an associated range of acceptability (as described above).

In the above described-example, resource scheduling application 118a, having communicated a resource negotiation request to agents 102b-f, may receive the response communicated by resource scheduling application 118b to agent 102a indicating that agent 102b has associated resource supply capabilities 112b including an aerial photograph within a two-mile radius of location A at a time within five minutes of time X. In addition, resource scheduling application 118a may receive responses communicated by resource scheduling applications 118d (indicating that agent 102d may be able to provide a aerial photograph within a five-mile radius of location B within fifteen minutes of time Y) and 118e (indicating that agent 102e may be able to provide an aerial photograph within a one-mile radius of location B within five minutes of time Y).

Based on the responses received from resource scheduling applications 118b, 118d, and 118e, resource scheduling application 118a may determine two solution entities. The first solution entity may include agent 102b (providing an aerial photograph of location A at time X within the corresponding range of acceptability) and 102d (providing an aerial photograph of location B at time Y within the corresponding range of acceptability). The second solution entity may include agent 102b (providing an aerial photograph of location A at time X within the corresponding range of acceptability) and 102e (providing an aerial photograph of location B at time Y within the corresponding range of acceptability).

Having determined a number of solution entities, a resource scheduling application 118 may be operable to communicate a second resource negotiation request to each capable agent 102 in each determined solution entity. The second resource negotiation request communicated to a particular capable agent may include one or more parameters corresponding to the one or more parameters of the first resource negotiation request that the particular capable agent was capable of fulfilling (within the range of acceptability, if appropriate) and/or one or more additional parameters. A particular parameter of the second negotiation request corresponding to a particular parameter of the first resource negotiation request may have a refined range of acceptability (as described in further detail below with respect to FIG. 4). A particular parameter of the second negotiation request corresponding to a particular parameter of the first resource negotiation request may also include one or more additional elements, as described above.

In the above described example in which agent 102a determined two solution entities (agent 102b belonging to one of the determined solution entity), resource scheduling application 118a may communicate a second resource negotiation request to agent 102b. The second resource negotiation request may include the parameter for which agent 102b responded to the first resource negotiation request (aerial photograph of A at time X), the parameter having a refined range of acceptability (e.g., an aerial photograph within a one mile radius of A within three minutes of time X). Additionally, the parameter may have one or more additional element (e.g., a high resolution aerial photograph within a one mile radius of A within three minutes of time X).

Upon receipt of responses to the second resource negotiation request from those capable agents 102 belonging to a determined solution entity capable of fulfilling one or more parameters of the second negotiation requests within the corresponding refined ranges of acceptability, the resource scheduling application 118 may generate further resource negotiation requests further refining the ranges of acceptability of the request parameters until a set of final solution entities is determined (when further refinement with respect to each capable agent is no longer possible or appropriate). A particular solution entity may then be selected by the agent 102 to fulfill the resource consumption requirements 110 to which the parameters of the resource negotiation request(s) corresponded, the solution entity being selected in any suitable manner.

In certain embodiments, system 100 may include one or more remote scheduling systems 106. For simplicity, the one or more remote scheduling systems 106 of system 100 will be referred to primarily in the singular throughout the remainder of this description. Remote scheduling system 106 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user of a resource scheduling system 104. Each computer system may include a personal computer, workstation, network computer, kiosk, wireless data port, PDA, one or more processors within these or other devices, or any other suitable processing device.

Remote scheduling system 106 may include one or more processing modules 120 and one or more memory modules 122. Processing module 114 may include one or more microprocessors, controllers, or any other suitable computing devices or resources. Processing module 120 may work, either alone or with other components of system 100, to provide the functionality of system 100 described herein. Memory module 122 may take the form of volatile or non-volatile memory including, without limitation, magnetic media, optical media, RAM, ROM, removable media, or any other suitable memory component.

Remote scheduling system 106 may include a remote scheduling application 124. Remote scheduling application 124 may include any suitable combination of software, hardware, and firmware.

Remote scheduling application 124 may be operable to receive from agents 102 of system 100 resource negotiation requests having one or more parameters, the one or more parameters having corresponding ranges of acceptability. Remote scheduling application 124 may be further operable to forward the received resource negotiation request to the other agents 102 (or agents 102 belonging to appropriate agent classification groups) of system 100. Remote scheduling application may be further operable to receive responses from those agents 102 (capable agents) capable of fulfilling one or more parameters of the negotiations request within the corresponding range of acceptability. Remote scheduling application may be further operable to determine one or more solution entities associated with the received resource negotiation request, each solution entity comprising on or more capable agents that can fulfill a different parameter of the resource negotiation request.

Thus, remote scheduling application 124 is operable to provide centralized receiving/routing of resource negotiation requests and responses. In other words, remote scheduling application 124 may provide an optional alternative to resource scheduling applications 118 associated with each agent 102 (as described above), with the functionality described above as being associated with each resource scheduling application 118 being provided by remote scheduling application 124 through the centralized receiving/routing of resource negotiation requests and responses. Remote scheduling application may perform the above-described scheduling functions in lieu of resource scheduling applications 118 or operate in conjunction with one or more resource scheduling applications 118.

In operation of an example embodiment of system 100, resource scheduling application 118a generates a first resource negotiation request. The resource negotiation request may contain one or more parameters, each parameter having a corresponding range of acceptability. Furthermore, the one or more parameters of the resource negotiation request may comprise all or part of the resource demand requirements 110a of the agent 102a. Resource scheduling application 118a then communicates the generated resource negotiation request via network 108 to agents 102b-f.

Agents 102b-f have associated resource scheduling systems 104b-f, each having an associated resource scheduling application 118b-f. Resource scheduling applications 118b-f receive the resource negotiation request communicated by resource scheduling application 118a and determine, based on a comparison of resource supply capabilities 112b-f of agents 102b-f and the parameters of the received resource negotiation request (considering corresponding ranges of acceptability, if appropriate), if associated agents 102 b-f can fulfill one or more of the parameters of the resource negotiation request within the specified range of acceptability. Upon a determination that one or more of the parameters can be fulfilled, one or more of resource scheduling applications 118b-f communicate a response to agent 102a indicating the parameter that can be fulfilled.

Resource scheduling application 118a receives the responses from the one or more capable agents 102 (agents 102 who can fulfill one or more of the parameters of the resource negotiation request within the specified range of acceptability) and forms solution entities, each solution entity comprising one of more capable agents 102 capable of providing a different parameter of the resource negotiation request. Resource scheduling application 118a may then communicate further resource negotiation requests having parameters with corresponding refined ranges of acceptability only to those capable agents in a solution entity in order to determine which capable agent or group of capable agents will actually fulfill the parameters of the resource negotiation request.

In certain embodiments, the refined ranges of acceptability of the parameters of further resource negotiation requests may be refined based on the supply capabilities 112 of the capable agents 102 of a determined solution entity. As a particular example, resource scheduling application 118a of agent 102a may generate a first resource negotiation request having two components: an aerial photograph and an infrared photograph. Additionally, each component of the resource negotiation request may have an associated location parameter (location 10) and a time parameter (time 10). In other words, the resource demand requirements 110a of the agent 102a may include an aerial photograph and an infrared photograph of the same location at the same time. Furthermore, the location parameters for each component of the negotiation request may have an associated range of acceptability (location in the range 0-20) and the time parameters for each component of the negotiation request may have an associated range of acceptability (time in the range 0-20).

Resource scheduling applications 118b-f of agent 102b-f may receive the communicated resource negotiation request, and determine if one or components of the request can be fulfilled for the specified parameters within the specified ranges of acceptability. For example resource scheduling application 118b may respond indicating that agent 102b can provide an aerial photograph in the location range 5-15 and in the time range 4-12. Additionally, resource scheduling application 118c may respond indicating that agent 102c can provide an infrared photograph in the location range 9-18 and in the time range 7-16. Based on these responses, resource scheduling application 118a may form a solution entity including agents 102b (providing the aerial photograph) and 102c (providing the infrared photograph).

Additionally, resource scheduling application 118a may communicate further resource negotiation requests having parameters with corresponding refined ranges of acceptability to only agents 102b and 102c, and the refined ranges of acceptability may be refined based on the capabilities of agents 102b and 102c. Because it may be important that the aerial photograph and the infrared photograph be of the same location at the same time, the ranges of acceptability may be refined to reflect the overlap in supply capabilities 112 of agents 102b and 102c. For example, a subsequent resource negotiation request may have the same components as the first resource negotiation request (i.e., the aerial photograph and the infrared photograph), and each component may have a refined range of acceptability reflecting the overlap in supply capabilities 112 of agents 102b and 102c (i.e., location in the range 9-15 and time in the range 7-12). Based on the responses to this subsequent resource negotiation request, resource scheduling application 118a further refine the ranges of acceptability associated with the parameters of the needed components and communicate further negotiation requests in order to determine which capable agent or group of capable agents will actually provide the components of the resource negotiation request.

Certain embodiments of the present invention may provide one or more technical advantages. Conventional techniques for identifying resource providers typically operate using publish/subscribe mechanisms by which certain agents 102 advertise the ability to provide certain resources (resource suppliers) and agents 102 in need of resources (resource consumers) subscribe to the advertisements in order to find suppliers that can fulfill those resource needs. These conventional techniques may be inefficient in that a resource consumer typically must negotiate with all resource suppliers rather than focus the negotiation on only those resource suppliers actually capable of supplying the resources that the resource consumer needs.

In contrast, according to certain embodiments of the present invention, the identification of a number of solution entities capable of fulfilling the parameters of a resource negotiation request and the limiting of further negotiation to the identified solution entities may increase efficiency by creating a narrowed search/optimization space through the elimination of agents 102 from the negotiation process that are irrelevant or infeasible with regard to the resource negotiation request.

In a national defense context, for example, current techniques for scheduling intelligence resources generally operate on a twenty-four hour cycle, with a plan including a number of tasks for a particular twenty-four hour period being scheduled in the previous twenty-four hour period. If, however, urgent requests necessitate a change in the plan, much of the remainder of the plan may be invalidated. According to certain embodiments of the present invention, the identification of solution entities capable of fulfilling the parameters of a particular resource negotiation request and the limiting of further negotiations to the identified solution entities schedules intelligence resources in a more reactive manner such that greater effective use of available resources may be achieved.

In the context of multi-agent, multi-tier negotiation, current techniques may be inefficient in that they do not automatically establish multi-tier relationships between agents 102 with the ability for one agent 102 to provide a particular resource being contingent on that agent's ability to establish links with other agents 102 that can supply resources needed for the agent 102 to provide the particular resource. Embodiments of the present invention may propagate resource requirements of one agent 102 to a number of other agents 102 and match those resource requirements with the resource supply capabilities of other agents 102 such that the intersection between requirements and capabilities can be iteratively refined until an explicit set of matching conditions is found.

Figure 2:
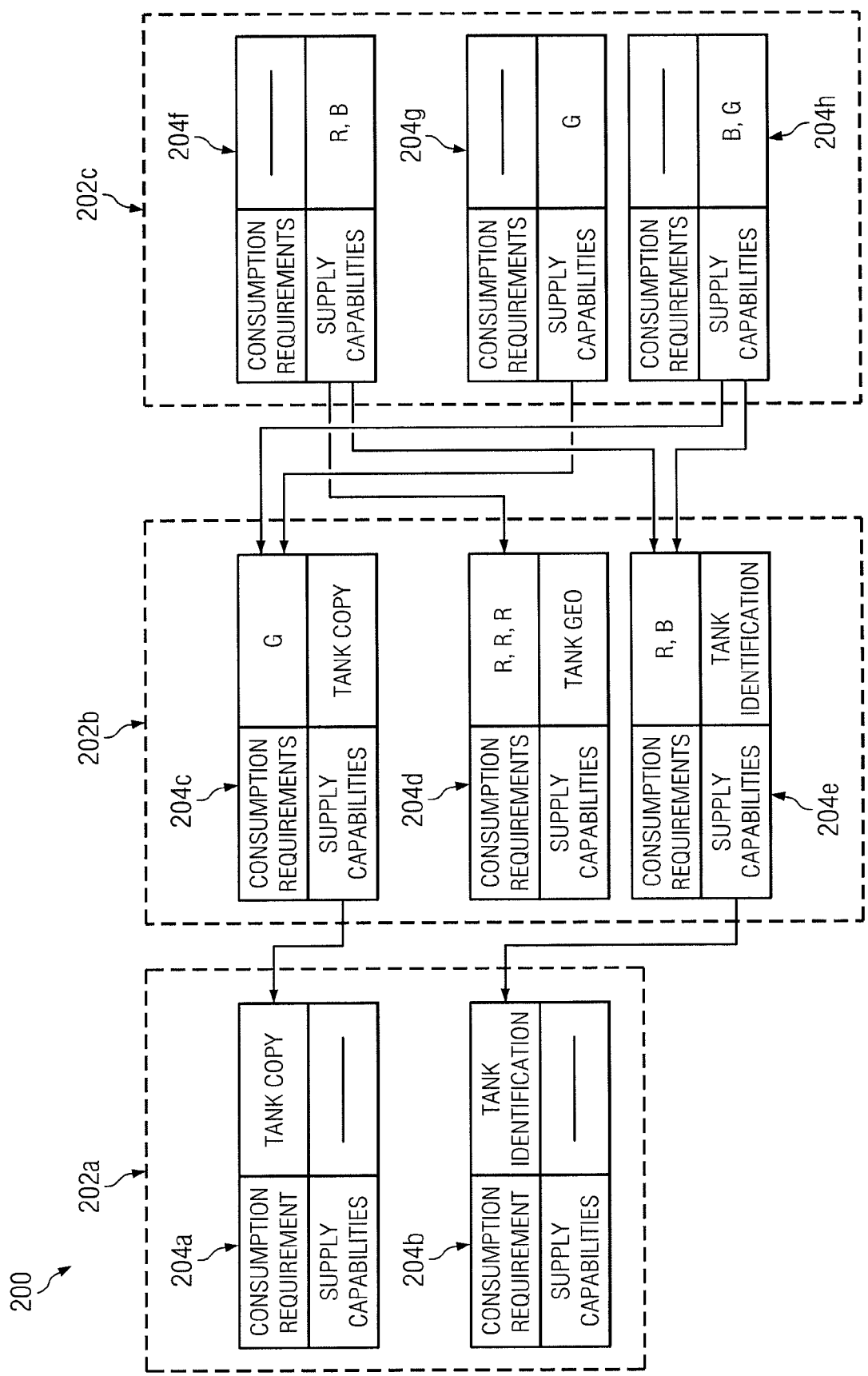
FIG. 2 illustrates an example multi-agent, multi-tier supply chain in an example system for establishing common interest negotiation links between consumers and suppliers to facilitate solving a resource allocation problem, according to certain embodiments of the present invention.

FIG. 2 illustrates an example multi-agent, multi-tier supply chain in an example system for establishing common interest negotiation links between consumers and suppliers to facilitate solving a resource allocation problem, according to certain embodiments of the present invention. Supply chain 200 may include one or more agent classification groups 202 (e.g., mission agent group 202a, target agent group 202b, and collector agent group 202c), and each agent classification group 202 may include one or more agents 204 (e.g., target agents 204c-e of target agent group 202b). Each agent 204 of supply chain 200 may have associated resource consumption requirements (such as resource consumption requirements 110) and resource supply capabilities (such as resource supply capabilities 112), although one or more agents 204 of supply chain 200 may have only resource consumption requirements or only resource supply capabilities. For example, in the illustrated embodiment, mission agents 204a-b of mission agent classification group 202a only have resource consumption requirements while collector agents 204f-h of collector agent classification group 202c have only resource supply capabilities.

The resource supply capabilities of an agent 204 may be dependent on the resource consumption requirements of that agent 204. Furthermore, the resource consumption requirements of an agent 204 may be dependent upon the resource supply capabilities of one or more other agents 204 in supply chain 200. In the examples that follow, the parameters of the various negotiation requests are described as having no corresponding ranges of acceptability for purposes of simplicity, although the present invention contemplates the parameters having any suitable corresponding ranges of acceptability.

For example, mission agent 204a may communicate a resource negotiation request (as described above with regard to system 100 of FIG. 1) to target agents 204c-e, the resource negotiation request including a single parameter, "TankCopy." In response to receiving the resource negotiation request, target agent 204c may communicate a resource negotiation request to collector agents 204f-h. The resource negotiation request communicated to collector agents 204f-h may include the parameters corresponding to consumption requirements of target agent 204c enabling target agent 204c to produce TankCopy (i.e., G) such that target agent 204c may determine whether to respond to the resource negotiation request received from mission agent 204a indicating that the TankCopy parameter of the resource negotiation request can be fulfilled. In other words, the resource supply capabilities of target agent 204c may be dependent on the resource consumption requirement of target agents 202c being fulfilled by the resource supply capabilities of collector agents 204f-h.

As another example, mission agent 204b may communicate a resource negotiation request to target agent 204e, the resource negotiation request including a single parameter, "TankID." In response to receiving the resource negotiation request, target agent 204e may seek to determine if it is capable of providing the requested TankID parameter (i.e., target agent 204e may seek to determine if it has associated resource supply capabilities including TankID). In order to have resource supply capabilities including TankID, target agent 204e may need to obtain R and B (i.e., target agent 204e has resource consumption requirements including R and B). Although the requirements are discussed as simply R and B for purposes of simplicity, it is understood that R and B may indicate differing types of data (e.g., aerial photographs and infrared images), each type of data having additional conditions (e.g., a location and time from which the data is required).

Target agent 204e may communicate a resource negotiation request having parameters R and B to collector agents 204f-h. The collector agents capable of providing R and B (collector agents having resource supply capabilities including R and B) may respond to the resource negotiation request. Thus, target agent 204e may receive a response from collector agent 204f indicating that R and B can be provided. Target agent 204e may also receive a response from collector agent 204h indicating that B can be provided.

Having received responses from collector agent 204f and collector agent 204h, target agent 204e may determine two solution entities, one including collector agent 204f (providing R and B) and the other including collector agent 204f (providing R) and collector agent 204h (providing B). Having determined two possible solution entities, target agent 204e may select a solution entity to provide the parameters of the resource negotiation request. Furthermore, target agent 204e may also respond to the resource negotiation request received from mission agent 204b (having the single parameter, TankID) indicating that TankID can be provided.

Although a particular number of agent classification groups 202 and agents 204 are depicted and primarily described, the present invention contemplates any suitable number of agent classification groups 202 and agents 204. Furthermore, although each agent 204 is described as performing a number of functions (e.g. communicating and receiving resource negotiation requests), it is understood that the functions may be performed by an associated resource scheduling system, such as resource scheduling system 114 described above in connection with FIG. 1.

Figure 3:
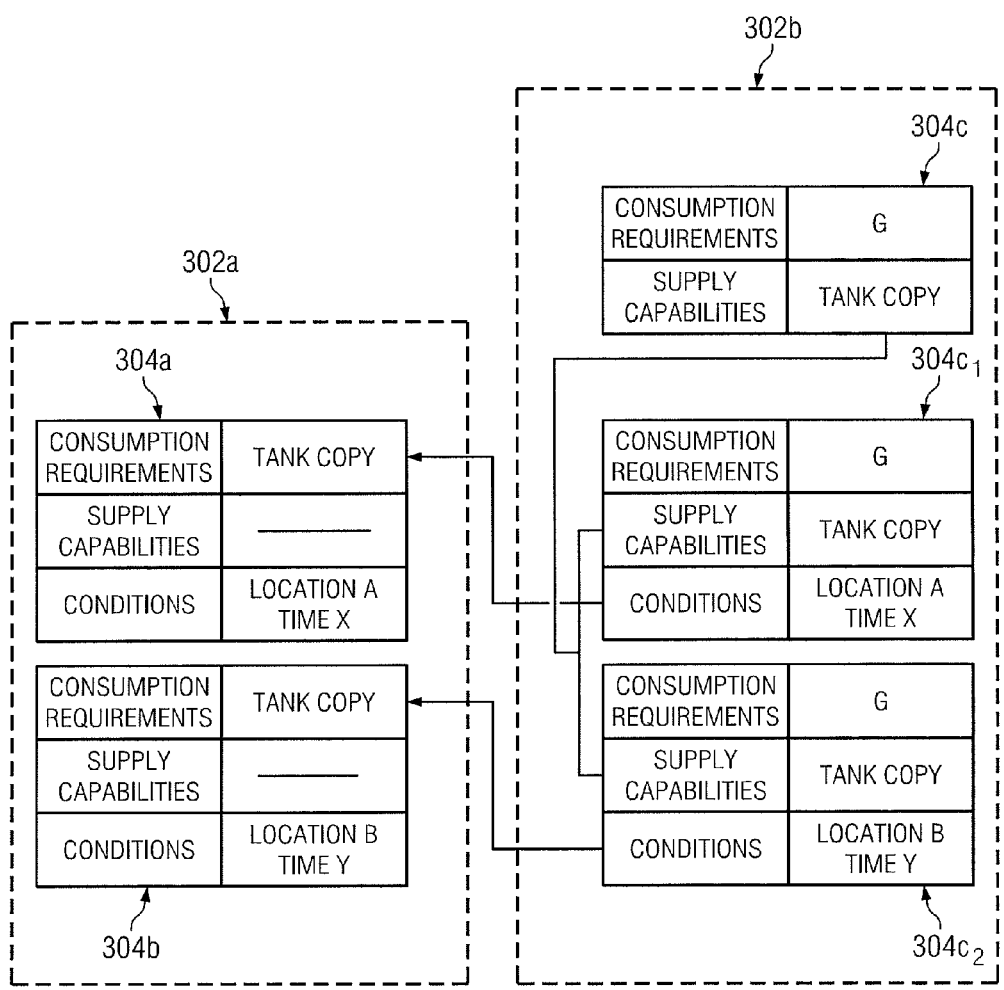
FIG. 3 illustrates an example supply chain with an agent having the capability to create one or more child instances, according to certain embodiments of the present invention.

FIG. 3 illustrates an example supply chain 300 with an agent 304 (e.g., an agent 102 of system 100) having the capability to create one or more child instances, according to certain embodiments of the present invention. Supply chain 300 may include one or more agent classification groups 302 (e.g., mission agent classification group 302a and target agent classification group 302b). Each agent classification group 302 may include one or more agents 304 (e.g., mission agents 304a-b of mission agent classification group 302a).

One or more agents 304 of supply chain 300 may have associated resource supply capabilities such that resources can be provided to multiple other agents 304 in supply chain 300. For example, target agent 304c may receive resource negotiation requests including the parameter "TankCopy" from both mission agent 302a and mission agent 302b. Furthermore, in order to have resource supply capabilities including TankCopy, target agent 304c may have associated resource consumption requirements including G (which may be obtained by submitting a resource negotiation request to other agent in the supply chain, as described above with regard to FIGS. 1 and 2). Consuming G, target agent 304c may be able to produce TankCopy under a number of conditions (e.g. locations A-B at times X-Y).

Furthermore, the resource consumption requirements of target agent 304c may be dependent upon the conditions associated with the received resource negotiation request for TankCopy, as mission agent 304a may request TankCopy under different conditions that mission agent 304b. In the examples that follow, the parameters of the various negotiation requests are described as having no corresponding ranges of acceptability for purposes of simplicity, although the present invention contemplates the parameters having any suitable corresponding ranges of acceptability.

For example, target agent 304c may receive a resource negotiation request including the parameter TankCopy having location element (location A) and a time element (at time X) from mission agent 304a (corresponding to the resource consumption requirements of mission agent 304a, which include TankCopy having conditions location A at time X). In order to produce TankCopy with at location A and time X, target agent 304c may need to consume G with conditions location A at time X. As a result, target agent 304c may communicate a resource negotiation request including parameter G having a location element (location A) and a time element (at time X) to a number of other agents 304 (e.g., collector agents as described above with regard to FIG. 2).

As another example, target agent 304c may receive a resource negotiation request including the parameter TankCopy having location element (location B) and a time element (at time Y) from mission agent 304b (corresponding to the resource consumption requirements of mission agent 304b, which include TankCopy having conditions location B at time Y). In order to produce TankCopy at location B and time Y, target agent 304c may need to consume G with conditions location B at time Y. As a result, target agent 304c may communicate a resource negotiation request including parameter G having a location element (location B) and a time element (at time Y) to a number of other agents 304 (e.g., collector agents as described above with regard to FIG. 2).

Due to the possible dependence of conditions associated with the resource consumption requirements of target agent 304c upon the elements of the parameters of the resource negotiation requests received from mission agents 304a and 304b, target agent 302c may operable to create one or more child instances (e.g., child instances $304c_1$ and $304c_2$), each child instance responsible only for fulfilling the elements of the parameters of the resource negotiation request of a single mission agent (e.g., child instance $304c_1$ is responsible only for fulfilling the elements of the parameters of the resource negotiation request of mission agent 304a and child instance $304c_2$ is responsible only for fulfilling the elements of the parameters of the resource negotiation request of mission agent 304b). As a result, target child instance $304c_1$, for example, will only have to produce TankCopy at location A at time X, meaning that target child instance $304c_1$ will only need to communicate a resource negotiation request to other agents 304 in the supply chain including parameter G having a location element (location A) and a time element (at time X). Once child instance $304c_1$ determines that one or more collector agents can provide G under the necessary conditions, target agent child 304c1 can then respond to the resource negotiation request of mission agent 302a indicating that the resource negotiation request can be fulfilled.

Although a particular number of agent classification groups 302 and agents 304 are depicted and primarily described, the present invention contemplates any suitable number of agent classification groups 302 and agents 304. Furthermore, although each agent 304 is described as performing a number of functions (e.g. communicating and receiving resource negotiation requests), it is understood that the functions may be performed by an associated resource scheduling system, such as resource scheduling system 114 described above in connection with FIG. 1.

Figure 4:
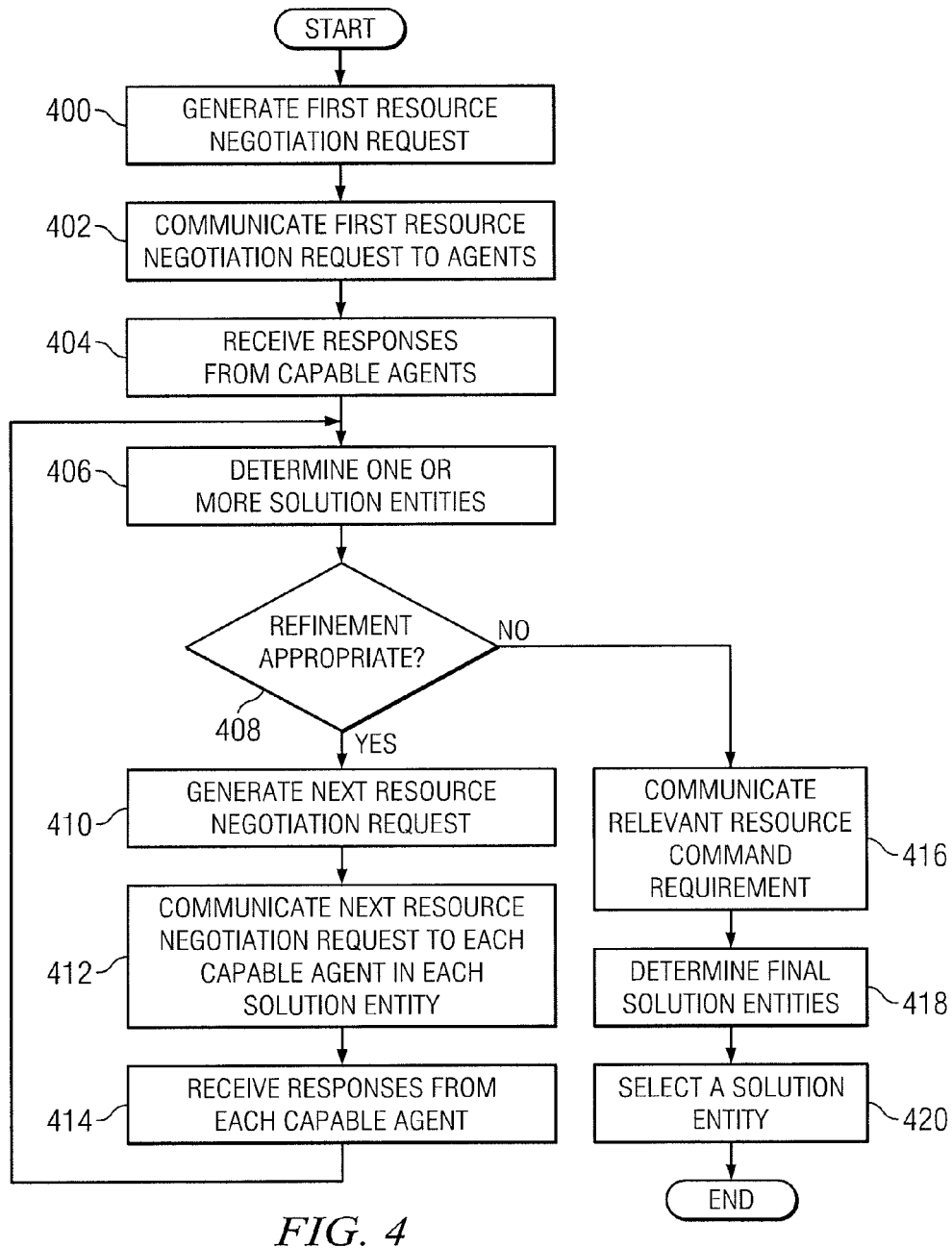
FIG. 4 illustrates an example method for establishing common interest negotiation links between consumers and suppliers to facilitate solving a resource allocation problem, according to certain embodiments of the present invention.

FIG. 4 illustrates an example method for establishing common interest negotiation links between consumers and suppliers to facilitate solving a resource allocation problem (e.g., using system 100 depicted in FIG. 1), according to certain embodiments of the present invention. At step 400, resource scheduling application 118 of resource scheduling system 104 generates a first resource negotiation request. The first resource negotiation request may include one or more parameters, each parameter having corresponding range of acceptability. Furthermore, the one or more parameters of the first resource negotiation request may comprise all or part of the resource demand requirements 110 of the agent 102.

For example, agent 102a may have resource consumption requirements 110a including an aerial photograph of location A at time X and location B at time Y. In order to fulfill these particular portions of consumption requirements 110a, resource scheduling application 118a associated with the agent 102a may generate a first resource negotiation request that includes a first parameter (location A at time X) and a second parameter (location B at time Y). Furthermore, each of the parameters of the first resource negotiation request may have a corresponding range of acceptability such that, rather than generating a first resource negotiation request including parameters with no range of acceptability (i.e., identical to the corresponding resource consumption requirements 110a (aerial photographs of location A at time X and location B at time Y), the first resource negotiation request may include parameters having a range of acceptability broader than the corresponding resource consumption requirements 110a (e.g., an aerial photograph within a twenty-mile radius of location A within one hour of time X and an aerial photograph of within a thirty-mile radius of location B within fifteen minutes of time Y).

At step 402, resource scheduling application 118 communicates the first resource negotiation request to one or more other agents 102. The request may be communicated to every other agent 102 in the system (e.g., agents 102b-f) or the request may be communicated to a particular subset of agents 102 of the system (such as a particular agent classification group 202, described above with respect to FIG. 2).

At step 404, resource scheduling application 118 receives zero or more responses from one or more agents 102 capable of fulfilling one or more of the parameters of the first resource negotiation request within the corresponding range of acceptability (capable agents). In the above described example, resource scheduling application 118a may receive responses from agents 102b, 102d, and 102e, the responses indicating that each agent has associated resource supply capabilities 112 including one or more of the parameters of the first resource negotiation request within the corresponding range of acceptability (e.g., agent 102b may have resource supply capabilities 112b including an aerial photograph within a two-mile radius of location A at a time within five minutes of time X; agent 102d may have resource supply capabilities 112d including a aerial photograph within a five-mile radius of location B within fifteen minutes of time Y; and agent 102e may have resource supply capabilities 112e including an aerial photograph within one mile radius of location B within five minutes of time Y).

At step 406, resource scheduling application 118 determines one or more solution entities based on the responses received from the one or more capable agents, each solution entity containing one or more capable agents (each capable agent fulfilling at least one parameter of the first resource negotiation request within the corresponding range of acceptability). In the above-described example, resource scheduling application 118a may determine two solution entities, the first solution entity including agent 102b (providing an aerial photograph of location A at time X within the corresponding range of acceptability) and 102d (providing an aerial photograph of location B at time Y within the corresponding range of acceptability), and the second solution entity including agent 102b (providing an aerial photograph of location A at time X within the corresponding range of acceptability) and 102e (providing and aerial photograph of location B at time Y within the corresponding range of acceptability).

At step 408, resource scheduling application 118 determines whether refinement of the ranges of acceptability corresponding to each parameter of the first resource negotiation request is appropriate with respect to each capable agent 102 in each solution entity. In the above described example, a response may have been received indicating that agent 102b could provide an aerial photograph within a two-mile radius of location A at a time within five minutes of time X. Because agent 102b responded within the specified range of acceptability, further refinement may be appropriate in that a new, narrower range or acceptability can be specified with regard to the parameter. For example, the range of acceptability may be refined such that the refined range of acceptability includes a photograph within a one mile radius of A within three minutes of X.

Furthermore, in determining whether refinement is appropriate, resource scheduling application 118a may also determine that an agent 102 is no longer a capable agent. For example, if an agent 102 responds to the resource negotiation request, but the agent 102 is not capable of fulfilling any parameter of the resource negotiation request within the corresponding range of acceptability, resource scheduling application 118a may also determine that the agent 102 is no longer a capable agent.

Although a particular method of determining if refinement is appropriate and with respect to the ranges of acceptability of the parameters of the resource negotiation request has been primarily described, the present invention contemplates any suitable method for making the determination. The determination as to whether refinement is appropriate and an example method of refinement is described in further detail in FIG. 5, below.

Upon a determination that refinement is appropriate with regard to the one or more parameters to be fulfilled by a particular capable agent in a solution entity, the process continues to step 412. At step 412, resource scheduling application 118 generates a second resource negotiation request having parameters with corresponding refined ranges of acceptability. A single second resource negotiation request may be generated containing the initial parameters having new, refined ranges of acceptability, or a second resource negotiation request may be generated that is specific to each capable agent according to the one or more parameters that agent is capable of fulfilling. In the above described example, a resource negotiation request may be sent to capable agents 102b, 102d, and 102e, the request having the refined parameters of an aerial photograph within a one mile radius of A within three minutes of X and an aerial photograph within a three mile radius of location B within ten minutes of time Y.

At step 412, resource scheduling application 118 communicates the second resource negotiation request(s) generated at step 410 to each capable agent in each solution entity. At step 414, resource scheduling application 118 receives responses to the second resource negotiation request communicated in step 412, the responses indicating whether each capable agent can fulfill one or more of the parameters within the corresponding refined ranges of acceptability. At step 406, resource scheduling application 118 determines one or more new solution entities, as described above. The method will then continue to step 408 where a determination will again be made as to whether refinement is appropriate, as described above.

Upon a determination at step 408 that refinement of the ranges of acceptability associated with each parameter of the second resource negotiation request is appropriate with respect to each capable agent in each solution entity, the process continues as discussed above. Upon a determination at step 408 that refinement of the ranges of acceptability associated with each parameter of the second resource negotiation request is not appropriate with respect to each capable agent in each solution entity (e.g., the narrowest intersection between the capable agents supply capabilities and the requested parameter having a corresponding range of acceptability has been identified), the process proceeds to step 416.

At step 416, resource scheduling application 118 communicates the particular resource demand requirements that are still relevant to the capable agent with respect to which refinement is no longer appropriate to the capable agent. In the above described example, if agent 102b were to respond to the resource negotiation request seeking an aerial photograph within a one mile radius of A within three minutes of X only that a photograph within one mile radius of A within three minutes of X could be provided (meaning that no further refinement is appropriate because the response is not narrower than the specified range of acceptability), a request for the actual resource requirement (an aerial photograph of location A at time X) would be communicated to agent 102b.

Once the refinement process is determined to be no longer appropriate with respect to all capable agents in a each solution entity (meaning that the relevant resource demand requirements have been communicated to each capable agent), resource scheduling application 118 determines one or more final solution entities at step 418. At step 420, resource scheduling application 118 selects one solution entity to fulfill the parameters of the resource demand requirement associated with the initial resource negotiation request. The selection may be based on any suitable factors (e.g. cost, convenience, time).

Figure 5:
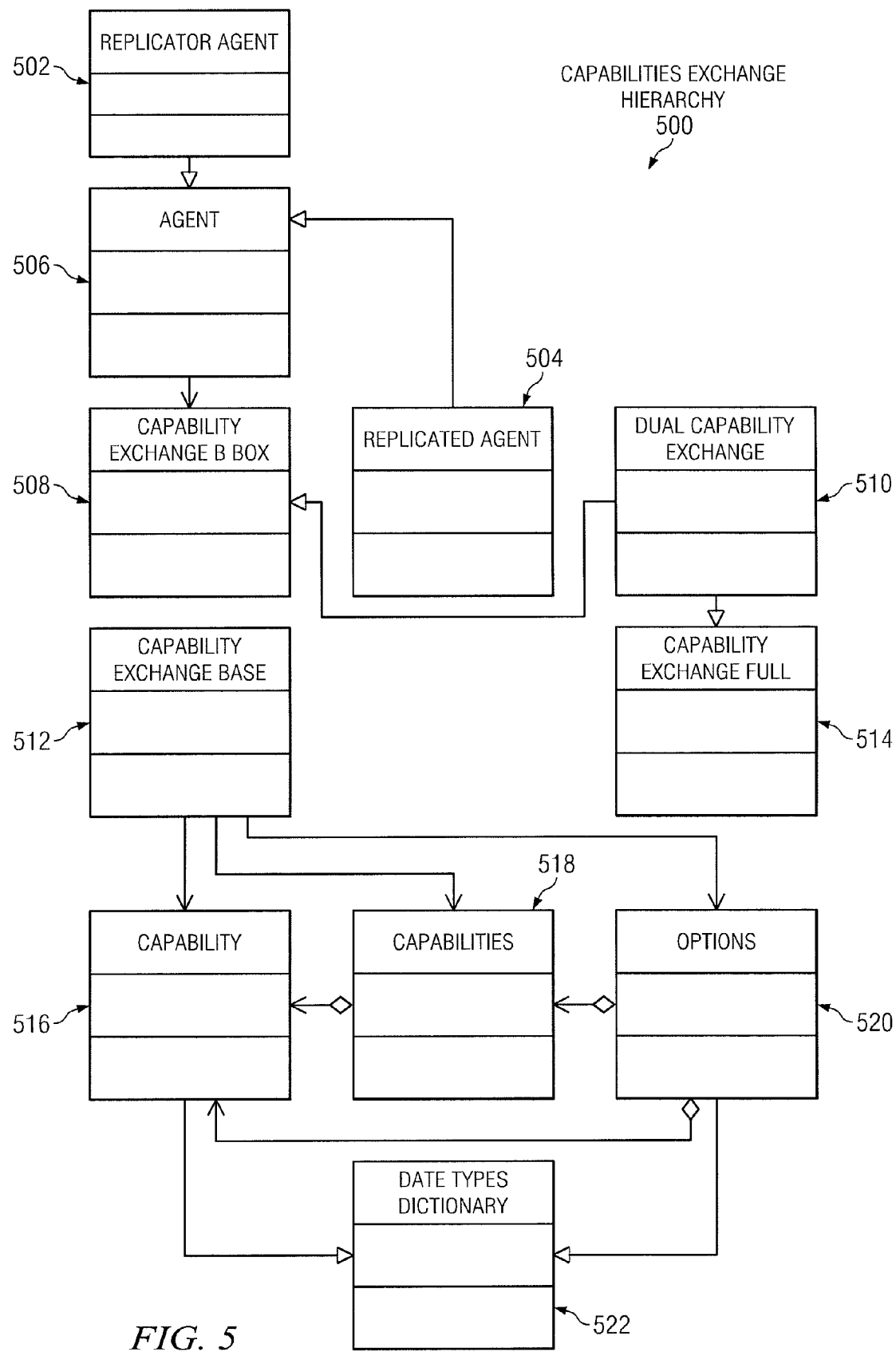
FIG. 5 illustrates a class hierarchy of an example implementation of a method for refining the range of acceptability associated with the one or more parameters of a resource negotiation request, according to certain embodiments of the present invention.

FIG. 5 illustrates a class hierarchy of an example implementation of a method for refining the range of acceptability associated with the one or more parameters of a resource negotiation request, according to certain embodiments of the present invention.

It will be assumed for purposes of this example that an agent 102 has associated resource demand requirements including aerial photographs of location A at time X and location B at time Y. The agent 102 may communicate an initial resource negotiation request to a plurality of other agents 102 (or agent classification groups), the initial resource negotiation request including a single parameter having a single broad range of acceptability (a "bounding box") encompassing both A and B at times including both X and Y such that the agent can easily eliminate those agents not relevant to the resource demand requirement. Once potential providers have been identified, however, it may be beneficial to refine the bounding box by narrowing to determine the agents capable of providing the particular required resources.

Capabilities Exchange hierarchy 500 is an example hierarchy that may facilitate the refinement process. Capabilities Exchange hierarchy 500 may include ReplicatorAgent class 502, a ReplicatedAgent class 504, and Agent class 506. Agent class 506 represents a generic agent that may exchange information on its resource demand requirements and resource supply capabilities with other agents by communicating and responding to resource negotiation requests. ReplicatorAgent class 502 and ReplicatedAgent class 504 are subclasses of agent class 506 that may support the unique needs of a resource supplier agent that spawns child instances in response to the receipt of a resource negotiation request from a consumer agent (as described above with regard to FIG. 3). ReplicatorAgent class 502 may perform the role of the parent instance (such as 304c in FIG. 3), which is responsible for responding to any resource negotiation requests from client agents with parameters that the agent can fulfill and for spawning a child instance (such as $304c_1$ in FIG. 3) whenever a resource negotiation request is received. ReplicatedAgent class 504 may perform the role of the child instance (such as $304c_1$ in FIG. 3), which is responsible for further negotiation with the client agent as well as for communicating the resource negotiation request for resource demand requirements that will be needed in order to fulfill the client agent's request.

Capabilities Exchange hierarchy 500 may also include a capability class 516, a capabilities class 518, and an options class 520 for describing the parameters of a particular agent's resource request. Capability class 516 and option class 520 may be implemented in the form of a data type dictionary (e.g., data types dictionary 522).

Capability class 516 is the basic unit of interest. Capability class 516 is implemented as a map from condition names (e.g., "where," "when," "priority," "duration") to sets of values for that condition. The meaning of a capability map is taken as a logical "and" of all the conditions in it (i.e., the intersection of interests). Furthermore, if a condition name is not included in the map, the condition is considered "unconstrained." An agent 102 interpreting a capability map associated with a parameter of a resource negotiation request must ignore all condition names it does not recognize, as this is necessary for extensibility. For example, a capability map associated with a parameter capability{"when": (1,2); "where": (here, there)} represents an interest in a parameter in locations "here" and "there" during times 1 and 2. Essentially, a capability map associated with a parameter represents essentially a rectangular bounding box of a subset of the multi-dimensional space of conditions.

Capabilities class 518 may hold a list of capability objects standing for a logical "or" of the conditions in it (i.e., a union of interests). Options class 520 may be a dictionary mapping "keys" (internal tokens) to a capability or capabilities description. The meaning of an options map is taken as a logical "or" of all the options. Options class 520 is very similar to capabilities class 518, where every entry in the list has a "name" token associated with it.

The capability class 516, capabilities class 518, and options class 520 may support three main operations. First, the three classes support comparison for inclusion (between two instances of any of the three classes, possibly different classes). Second, the three classes support determining an intersection (between two instances of any of the three classes, possibly different ones). Third, the three classes support determining a bounding box, a bounding box being the tightest capability that contains the given capability/capabilities/options.

Capabilities Exchange hierarchy 500 may also include a CapabilityExchangeBase class 512, CapabilityExchangeBBox class 508, a CapabilityExchangeFull class 514, and a DualCapabilityExchange class 510 for negotiation of common interest between agents. CapabilityExchangeBase class 512 implements the core of the hierarchy. In the CapabilityExchangeBase class 512, an agent 102 seeking to fulfill a resource requirement by negotiating a resource request having one or more parameters to potential provider agents maintains "relevant interest" with those capable agents that respond to the resource request (the intersection of one or more of the parameters of the request with the supply capabilities received from the capable agent in response to the resource negotiation request). If a capable agent updates the supply capability in the course of further negotiation, the updated supply capability is recorded and the relevant interests are updated. In addition, a further resource negotiation request may be sent to the capable agent, the resource negotiation request having one or more refined parameters (as described above with respect to FIG. 4). If no refinement to the parameter is required, the provider agent is notified that relevant interests have converged. Furthermore, once the relevant interests between the agent seeking to fulfill a resource requirement and the capable agent, the agent seeking to fulfill a resource requirement may keep a "generation number" which allows resetting and restarting of the negotiation process if the resource requirements or supply capabilities of either side change due to some external (with respect to the particular negotiation) event.

CapabilityExchangeBBox class 508 may extend the CapabilityExchangeBase class 512 with the BBox strategy, the BBox strategy being to always send the current tightest bounding box of the intersection between the requirements of the agent seeking to fulfill a resource requirement and the latest capabilities received from the capable agent. Once the bounding box can no longer be improved, the negotiation concludes.

CapabilityExchangeFull class 514 may implement a "full strategy." The full strategy may follow the BBox strategy. Once the bounding box can no longer be improved, the agent seeking to fulfill resource requirements communicates the remaining relevant requirements (the portion of the requirements of the initial resource negotiation request that remain relevant base upon what was learned through negotiation about the capable agents supply capabilities) in full detail.

DualCapabilityExchange class 510 may follow a more complex "dual capability exchange" hierarchy (which is compatible with Capabilities Exchange hierarchy 500 and can be used in negotiation between one agent using the dual capability exchange hierarchy and the other agent using the standard capability exchange hierarchy) supports the situation where an agent has complimentary interests. In other words, when an agent 102 seeking resources needs to have its resource requirements fulfilled by a resource provider, but also needs the capabilities of multiple resource providers to compliment one another, making it possible that some of the providers' capabilities become irrelevant even when they fulfill an agents resource requirements. This may be implemented by running a tightly coupled pair of negotiations.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented method, comprising:
   communicating via a computer processor a first resource negotiation request to a plurality of agents, the first resource negotiation request comprising one or more first parameters each having a corresponding first range of acceptability;
   receiving one or more first request responses from each of one or more capable agents, each capable agent being an agent that is operable to fulfill at least one parameter of the first resource negotiation request within the corresponding first range of acceptability;
   determining one or more first solution entities based on the one or more first request responses received from the one or more capable agents, each first solution entity comprising one or more of the capable agents, the one or more capable agents of each first solution entity operable to fulfill the one or more parameters of the first resource negotiation request within the corresponding first ranges of acceptability, each capable agent operable to fulfill at least one parameter of the first resource negotiation request within the corresponding first range of acceptability;
   communicating a second resource negotiation request to each capable agent in each determined first solution entity, the second resource negotiation request comprising one or more second parameters each having a corresponding second range of acceptability;
   receiving one or more second request responses from one or more of the capable agents of the one or more first solution entities;
   determining one or more second solution entities based on the one or more second request responses received from the one or more capable agents from which the one or more second request responses are received, each second solution entity comprising one or more capable agents, the one or more capable agents of each second solution entity operable to fulfill the one or more parameters of the second resource negotiation request within the associated ranges of acceptability, each capable agent fulfilling at least one parameter of the second resource negotiation request within the corresponding second range of acceptability; and
   communicating a third resource negotiation request to each capable agent in each determined second solution entity, the third resource negotiation request comprising one or more third parameters each having a corresponding third range of acceptability.

2. The method of claim 1, wherein the first range of acceptability corresponding to at least one first parameter of the first resource negotiation request is equal to the second range of acceptability corresponding to at least one second parameter of the second resource negotiation request that corresponds to the at least one first parameter of the first resource negotiation request.

3. The method of claim 1, wherein the first range of acceptability corresponding to at least one first parameter of the first resource negotiation request is broader than the second range of acceptability corresponding to at least one second parameter of the second resource negotiation request that corresponds to the at least one first parameter of the first resource negotiation request.

4. The method of claim 1, wherein the second parameters of the second resource negotiation request comprise at least the first parameters of the first resource negotiation request.

5. The method of claim 1, comprising:
   receiving, from a third party requestor, an initial resource negotiation request comprising one or more initial parameters each having an initial range of acceptability;
   communicating, in response to the receipt of the initial resource negotiation request in order to determine if one or more of the initial parameters can be fulfilled, the first resource negotiation request to the plurality of agents.

6. The method of claim 5, comprising creating, in response to the receipt of the initial request from the third party requestor, a child instance corresponding to the third party requestor, the child instance being responsible solely for negotiation with the third party requestor.

7. A system, comprising:
   one or more computer processors operable to:
   communicate a first resource negotiation request to a plurality of agents, the first resource negotiation request comprising one or more first parameters each having a corresponding first range of acceptability;
   receive one or more first request responses from each of one or more capable agents, each capable agent being an agent that is operable to fulfill at least one parameter of the first resource negotiation request within the corresponding first range of acceptability;
   determine one or more first solution entities based on the one or more first request responses received from the one or more capable agents, the one or more capable agents of each first solution entity operable to fulfill the one or more parameters of the first resource negotiation request within the corresponding first ranges of acceptability, each capable agent operable to fulfill at least one parameter of the first resource negotiation request within the corresponding first range of acceptability;
   communicate a second resource negotiation request to each capable agent in each determined first solution entity, the second resource negotiation request comprising one or more second parameters each having a corresponding second range of acceptability;
   receive one or more second request responses from one or more of the capable agents of the one or more first solution entities;
   determine one or more second solution entities based on the one or more second request responses received from the one or more capable agents from which the one or more second request responses are received, each second solution entity comprising one or more capable agents, the one or more capable agents of each second solution entity operable to fulfill the one or more parameters of the second resource negotiation request within the associated ranges of acceptability, each capable agent fulfilling at least one parameter of the second resource negotiation request within the corresponding second range of acceptability; and
   communicate a third resource negotiation request to each capable agent in each determined second solution entity, the third resource negotiation request comprising one or more third parameters each having a corresponding third range of acceptability.

8. The system of claim 7, wherein the first range of acceptability corresponding to at least one first parameter of the first resource negotiation request is equal to the second range of acceptability corresponding to at least one second parameter of the second resource negotiation request that corresponds to the at least one first parameter of the first resource negotiation request.

9. The system of claim 7, wherein the first range of acceptability corresponding to at least one first parameter of the first resource negotiation request is broader than the second range of acceptability corresponding to at least one second parameter of the second resource negotiation request that corresponds to the at least one first parameter of the first resource negotiation request.

10. The system of claim 7, wherein the second parameters of the second resource negotiation request comprise at least the first parameters of the first resource negotiation request.

11. The system of claim 7, wherein the one or more processing units are operable to:
receive, from a third party requestor, an initial resource negotiation request comprising one or more initial parameters each having an initial range of acceptability;
communicate, in response to the receipt of the initial resource negotiation request in order to determine if one or more of the initial parameters can be fulfilled, the first resource negotiation request to the plurality of agents.

12. The system of claim 11, wherein the one or more processing units are operable to create, in response to the receipt of the initial request from the third party requestor, a child instance corresponding to the third party requestor, the child instance being responsible solely for negotiation with the third party requestor.

13. Software embodied in a tangible computer-readable storage device, the software operable when executed to perform operations comprising:
communicating a first resource negotiation request to a plurality of agents, the first resource negotiation request comprising one or more first parameters each having a corresponding first range of acceptability;
receiving one or more first request responses from each of one or more capable agents, each capable agent being an agent that is operable to fulfill at least one parameter of the first resource negotiation request within the corresponding first range of acceptability;
determining one or more first solution entities based on the one or more first request responses received from the one or more capable agents, each first solution entity comprising one or more of the capable agents, the one or more capable agents of each first solution entity operable to fulfill the one or more parameters of the first resource negotiation request within the corresponding first ranges of acceptability, each capable agent operable to fulfill at least one parameter of the first resource negotiation request within the corresponding first range of acceptability;
communicating a second resource negotiation request to each capable agent in each determined first solution entity, the second resource negotiation request comprising one or more second parameters each having a corresponding second range of acceptability;
receiving one or more second request responses from one or more of the capable agents of the one or more first solution entities;
determining one or more second solution entities based on the one or more second request responses received from the one or more capable agents from which the one or more second request responses are received, each second solution entity comprising one or more capable agents, the one or more capable agents of each second solution entity operable to fulfill the one or more parameters of the second resource negotiation request within the associated ranges of acceptability, each capable agent fulfilling at least one parameter of the second resource negotiation request within the corresponding second range of acceptability; and
communicating a third resource negotiation request to each capable agent in each determined second solution entity, the third resource negotiation request comprising one or more third parameters each having a corresponding third range of acceptability.

14. The software of claim 13, wherein the first range of acceptability corresponding to at least one first parameter of the first resource negotiation request is equal to the second range of acceptability corresponding to at least one second parameter of the second resource negotiation request that corresponds to the at least one first parameter of the first resource negotiation request.

15. The software of claim 13, wherein the first range of acceptability corresponding to at least one first parameter of the first resource negotiation request is broader than the second range of acceptability corresponding to at least one second parameter of the second resource negotiation request that corresponds to the at least one first parameter of the first resource negotiation request.

16. The software of claim 13, wherein the second parameters of the second resource negotiation request comprise at least the first parameters of the first resource negotiation request.

17. The software of claim 13, operable when executed to perform operations comprising:
receiving, from a third party requestor, an initial resource negotiation request comprising one or more initial parameters each having an initial range of acceptability;
communicating, in response to the receipt of the initial resource negotiation request in order to determine if one or more of the initial parameters can be fulfilled, the first resource negotiation request to the plurality of agents.

18. The software of claim 17, operable when executed to perform operations comprising creating, in response to the receipt of the initial request from the third party requestor, a child instance corresponding to the third party requestor, the child instance being responsible solely for negotiation with the third party requestor.

19. A computer-implemented method, comprising:
communicating via a computer processor a first resource negotiation request from a consumer to a plurality of supplier agents, the first resource negotiation request comprising first parameters each having a corresponding first range of acceptability, the plurality of supplier agents comprising business enterprises in a supply chain;
receiving first request responses from capable agents, each capable agent being an agent that is operable to fulfill at least one parameter of the first resource negotiation request within the corresponding first range of acceptability;
determining first solution entities based on the first request responses received from the capable agents, each first solution entity comprising the capable agents, the capable agents of each first solution entity operable to fulfill the parameters of the first resource negotiation request within the corresponding first ranges of acceptability, each capable agent operable to fulfill at least one parameter of the first resource negotiation request within the corresponding first range of acceptability;

communicating a second resource negotiation request to each capable agent in each determined first solution entity, the second resource negotiation request comprising second parameters each having a corresponding second range of acceptability;

receiving one or more second request responses from one or more of the capable agents of the one or more first solution entities;

determining one or more second solution entities based on the one or more second request responses received from the one or more capable agents from which the one or more second request responses are received, each second solution entity comprising one or more capable agents, the one or more capable agents of each second solution entity operable to fulfill the one or more parameters of the second resource negotiation request within the associated ranges of acceptability, each capable agent fulfilling at least one parameter of the second resource negotiation request within the corresponding second range of acceptability; and communicating a third resource negotiation request to each capable agent in each determined second solution entity, the third resource negotiation request comprising one or more third parameters each having a corresponding third range of acceptability.

* * * * *

UNITED STATES PATENT AND TRADEMARK OFFICE
CERTIFICATE OF CORRECTION

| | |
|---|---|
| PATENT NO. | : 8,370,422 B2 |
| APPLICATION NO. | : 12/702062 |
| DATED | : February 5, 2013 |
| INVENTOR(S) | : Payton et al. |

It is certified that error appears in the above-identified patent and that said Letters Patent is hereby corrected as shown below:

In the Drawings

Sheet 3 of 5 Fig. 3, Above reference numeral "302a", insert --300--, therefor

Sheet 5 of 5 Fig. 5, delete "DATE" and insert --DATA--, therefor

In the Specification

In column 2, line 52, delete "invention." and insert --invention;--, therefor

In column 6, line 5, delete "and or" and insert --and/or--, therefor

In column 6, line 25, after "photograph", delete "of", therefor

In column 7, line 40, delete "application" and insert --system--, therefor

In column 7, line 41, delete "application" and insert --system--, therefor

In column 8, line 51, after "radius", delete "20", therefor

In column 9, line 26, delete "a" and insert --an--, therefor

In column 10, line 44, delete "114" and insert --120--, therefor

In column 11, line 4, delete "on" and insert --one--, therefor

In column 11, line 39, delete "102 b-f" and insert --102b-f--, therefor

Signed and Sealed this
Twenty-ninth Day of September, 2015

Michelle K. Lee
*Director of the United States Patent and Trademark Office*

CERTIFICATE OF CORRECTION (continued)
U.S. Pat. No. 8,370,422 B2

In column 11, line 51, delete "of" and insert --or--, therefor

In column 12, line 14, after "or", insert --more--, therefor

In column 14, line 59, delete "114" and insert --104--, therefor

In column 16, line 7, delete "304c1" and insert --$304c_1$--, therefor

In column 16, line 18, delete "114" and insert --104--, therefor

In column 16, line 45, delete "(aerial" and insert --aerial--, therefor

In column 16, line 51, after "photograph", delete "of", therefor

In column 17, line 7, delete "a" and insert --an--, therefor

In column 17, line 64, delete "412" and insert --410--, therefor

In column 17, line 64, delete "412" and insert --410--, therefor

In column 19, line 14, delete "ReplicatorAgent" and insert --Replicator Agent--, therefor In column 19, line 15, delete "ReplicatedAgent" and insert --Replicated Agent--, therefor In column 19, line 19, delete "ReplicatorAgent" and insert --Replicator Agent--, therefor In column 19, line 20, delete "ReplicatedAgent" and insert --Replicated Agent--, therefor In column 19, line 25, delete "ReplicatorAgent" and insert --Replicator Agent--, therefor In column 19, line 30, delete "ReplicatedAgent" and insert --Replicated Agent--, therefor In column 20, line 12, delete "CapabilityExchangeBase" and insert --Capability Exchange Base--, therefor In column 20, line 12-13, delete "CapabilityExchangeBBox" and insert --Capability Exchange B Box--, therefor In column 20, line 13, delete "CapabilityExchangeFull" and insert --Capability Exchange Full--, therefor In column 20, line 14, delete "DualCapabilityExchange" and insert --Dual Capability Exchange--, therefor

CERTIFICATE OF CORRECTION (continued)
U.S. Pat. No. 8,370,422 B2

In column 20, line 15, delete "CapabilityExchangeBase" and insert --Capability Exchange Base--, therefor In column 20, line 16-17, delete "CapabilityExchangeBase" and insert --Capability Exchange Base--, therefor In column 20, line 40, delete "CapabilityExchangeBBox" and insert --Capability Exchange B Box--, therefor In column 20, line 40-41, delete "CapabilityExchangeBase" and insert --Capability Exchange Base--, therefor In column 20, line 48, delete "CapabilityExchangeFull" and insert --Capability Exchange Full--, therefor In column 20, line 54, delete "base" and insert --based--, therefor In column 20, line 56, delete "DualCapabilityExchange" and insert --Dual Capability Exchange--, therefor In the Claims In column 24, line 32 in Claim 17, delete "comprising;" and insert --comprising:--, therefor